United States Patent
Chen et al.

(10) Patent No.: US 9,721,079 B2
(45) Date of Patent: Aug. 1, 2017

(54) IMAGE AUTHENTICITY VERIFICATION USING SPEECH

(71) Applicants: Steve Y Chen, Skokie, IL (US); David Y Chen, Arlington Heights, IL (US)

(72) Inventors: Steve Y Chen, Skokie, IL (US); David Y Chen, Arlington Heights, IL (US)

(*) Notice: Subject to any disclaimer, the term of this patent is extended or adjusted under 35 U.S.C. 154(b) by 748 days.

(21) Appl. No.: 14/155,559

(22) Filed: Jan. 15, 2014

(65) Prior Publication Data
US 2015/0199502 A1    Jul. 16, 2015

(51) Int. Cl.
| G06K 5/00 | (2006.01) |
| G06F 21/32 | (2013.01) |
| G06Q 50/26 | (2012.01) |
| H04L 29/06 | (2006.01) |
| G06K 9/00 | (2006.01) |
| G10L 17/00 | (2013.01) |

(52) U.S. Cl.
CPC ......... *G06F 21/32* (2013.01); *G06K 9/00221* (2013.01); *G06K 9/00892* (2013.01); *G06K 9/00899* (2013.01); *G06Q 50/265* (2013.01); *H04L 63/0861* (2013.01); *G10L 17/005* (2013.01)

(58) Field of Classification Search
CPC ............... G06Q 20/388; G06Q 20/425; G06Q 20/4097; G06Q 30/01
USPC .................................. 235/380, 382
See application file for complete search history.

(56) References Cited

U.S. PATENT DOCUMENTS

| 7,499,574 | B1 | 3/2009 | Yang et al. |
| 8,516,562 | B2 | 8/2013 | Headley |
| 2002/0091646 | A1 | 7/2002 | Lake et al. |
| 2009/0169062 | A1 | 7/2009 | Cheung et al. |
| 2011/0188713 | A1 | 8/2011 | Chin et al. |
| 2011/0225048 | A1* | 9/2011 | Nair ........................ G06Q 30/02 705/14.66 |
| 2012/0106805 | A1 | 5/2012 | Shuster |
| 2012/0180115 | A1 | 7/2012 | Maitland |
| 2013/0073975 | A1* | 3/2013 | Bladel ................... G06Q 50/265 715/739 |
| 2013/0090059 | A1 | 4/2013 | Edwards |
| 2014/0162598 | A1* | 6/2014 | Villa-Real ............... H04M 1/66 455/411 |

* cited by examiner

*Primary Examiner* — Daniel St Cyr
(74) *Attorney, Agent, or Firm* — Michael J. Feigin, Esq.; Feigin & Fridman

(57) ABSTRACT

Verifying the identity of a person claiming to be represented by a picture by way of providing a string of text (randomly generated or generated by another person seeking verification of same) to be recited by the claimant. The string of text is recited in a video which is received by an intermediary server at a network node, or by a person seeking such verification. Automated processes may be utilized to compare the audio and video received to the picture and string of text sent. Further, comparisons to previously received audio, video, and strings of text, as well as the same available from third parties, may be used to determine fraud attempts. Viewers of the person's profile may also vote on the authenticity of a profile, thereby raising or lowering a certification confidence level, with their votes weighted more heavily towards those who have high confidence levels.

20 Claims, 8 Drawing Sheets verifyme my account [dave] | verify myself | logout

To verify your identity, press the 'Record Video' button. You will get a 3 second countdown and your camera will start recording.

After the countdown, say this verification sentence out loud:

The brown puppy leapt over the blue wooden fence.

When you are finished, press the 'Done' button.

| Record Video | Done |

You can also upload a video of yourself saying the verification sentence. Click the 'Upload Video' button below.

| Upload Video |

Profile Information

Enter your User ID at the various social networks and web sites that you are a member of. You may also enter your phone number or email address here.
*Note:* To protect your privacy, this information is not displayed to the public. The user may only verify information that you have given him/her.

Phone
Facebook
LinkedIn
Instagram

User ID, Phone Number or Email:
InstaDavePhotog

| Verify Profile |

Figure 6

IMAGE AUTHENTICITY VERIFICATION USING SPEECH

FIELD OF THE DISCLOSED TECHNOLOGY

The disclosed technology relates generally to authenticating an image, and, more specifically, to verification using challenge speech in connection with the image.

BACKGROUND OF THE DISCLOSED TECHNOLOGY

Identity theft and identity fraud (pretending to be someone you are not) is a large problem in online, and even telephonic, communication. In the 2003 movie, "Bringing Down the House," a female con artist tricks Steve Martin into thinking she's the woman he's been talking to online. True, she is in the picture he sent her, but she was actually in the background of someone else's portrait, being arrested by police.

While the above is a fictional example, unfortunately, such problems do occur in real life and can be very dangerous. As a result, they are also disruptive to commerce, since the trustworthiness of information in online networks is called into doubt. For example, in a popular television show, "Dr. Phil," aired Feb. 20, 2013, host Phillip Calvin McGraw interviewed a woman who, over time, sent $185,000 to a Nigerian scam artist who pretended to be her boyfriend. They met on an online dating site and continued to "date" via the phone and email for over a year. Meanwhile, another woman appeared on the show to prove that she was real, and her photographs, shared on a social media website and publicly viewable, were being used by another woman to extort money out of at least three different men who thought they were "engaged" to the woman in the pictures.

The prior art has attempted to deal with this problem. US Patent Publication 2012/0180115 to Maitland has a person send an image showing a verification code in the image. US Patent Publication 2012/0106805 to Shuster and US 2009/0169062 to Cheung et al. have a person strike a certain pose in the image sent. Further, U.S. Pat. No. 8,516,562 to Headley uses a "biometric template" including voice data, and comparing such data to the prior user. This method, however, is limited to verifying by "device id" and prior logins and, as such, does not appear to verify anything other than consistency of a voice from a certain location.

There remains a long felt need to authenticate users as being who they say they are. Given the long-standing continuing problem is this area, further work needs to be done.

SUMMARY OF THE DISCLOSED TECHNOLOGY

Therefore, it is an object of the disclosed technology to verify the authenticity of a picture associated with an online profile.

A method of confirming the identity of a person in a picture is carried out by receiving a picture with a version of an individual's likeness via a first network node associated with a first individual. This may include receiving, from the first network node, instructions to download the picture from a third party server. A string of text is provided to the first individual via the first network node. This individual is instructed to record a video of himself reading/pronouncing the text within the string which is provided to him either in audio or text form. Data are then received back from this person in the form of a video. This video is analyzed by automated mechanisms and/or by other individuals to determine (such as by using a processor which carries out instructions) whether the video has associated audio representative of the string of text. A further determination is made as to whether the video has images of the first individual. If the determinations are made in the positive, then via at least a second network node, a certification to at least a second individual is made. The certification states that the picture with a version of the individual's likeness is that of the first individual.

Within the scope of "receiving a picture" from an individual includes receiving a picture which was already posted or previously sent to a third party server, such as another server connected to the Internet. The first individual may, for example, send the name and access credentials for one or more third party servers (websites) with pictures, the identity of which may also be verified by other users. The first individual may also send the link to his or her profile on a third party server (website) to another user, and that user may verify that the pictures on the third party server actually depict the first individual.

The audio representative of the text may be determined as legitimate (from the person shown in the picture) based on votes from other people, for instance as those viewing a profile of a person in an online forum such as a dating site. Alternatively or additionally, the audio may be converted to text using an automated process (speech recognition), and only if the newly converted text matches above a pre-defined threshold level is the corresponding video presented to viewers for voting.

To determine if the video is of the person in the picture, face recognition engines may be used. When used, the output of the face recognition determines if a video matches at least above a pre-defined level. If so, the video is presented for viewers to vote on the authenticity thereof.

Geolocation may be employed to determine authenticity. Using GPS, Wi-Fi, IP address, or other methods of determining a location, this may be compared to user-entered data such as current location listed on a social networking profile from which an image of the person is associated.

The first individual may be required to provide his or her user authentication credentials (such as a user name, password, biometric data, voice, or face data) before communicating as a certified individual associated with the certification of the picture in question.

The string of text sent to the first person may be received from a person who desires contact with this person, such as via his or her social network profile (by way of selecting a person to talk to through an electronic interface). This second person provides the text to be spoken by the first person and then indicates whether or not the video matches (includes the string of text and matches the photo of the first person) by a positive indication thereof, or by starting or continuing communication with the first person. Each first and second person may require and do the same for each other.

A hyperlinked (defined as actionable object displayed on a screen and selectable) badge may be provided for use in connection with a certified picture, the hyperlink linking to a server operated by an entity carrying out the method.

The string of text may be randomly or pseudo-randomly generated from a stored database of words. The string may be compared to previous strings to ensure that the generated string has not been used before. Further, words chosen may include specific lip shapes which are made with sounds representative of the words (for example, a person saying an "M" closes their mouth and a person saying a "Q" flexes their lips) to prevent dubbing audio over a different video. A new string of text is generated and sent to the first individual when the first randomly generated string of text was found to lack uniqueness. Likewise, the video may be compared to previous videos in the database, as may be the picture of the first individual, to determine when fraud is being attempted by way of a duplicate likeness within the certification system. Images available from third party internet servers, such as social networks and search engines, may be used to find and verify or detect fraud associated with the first person/user or another user of the method or system.

A certification may be made when a match of both audio and video is above a pre-defined threshold. Then, a percentage certainty is provided with the certification for viewing by others. The percentage certainty may be raised based on the number of votes by third parties that the video and/or audio match the person in the image. A vote may be more heavily weighted when the person voting is also certified, and votes may be weighted more heavily when their percentage rating is higher than another (whose vote counts less). Users can also verify that an account on a 3$^{rd}$ party website (such as Facebook or Match.com) belongs to the first individual by querying servers used to carry out embodiments of the disclosed technology. If the first individual has entered the websites and the user ids associated with his or her accounts, users can search these to make sure the ones they were given really belong to the first individual and not an imposter who has stolen his or her pictures.

A device with a processor configured to carry out instructions, is also disclosed. The device has a network input/output device receiving data representative of a picture of an individual's likeness via a first network node associated with a first individual, a first non-transitory storage medium with a stored string of text to be sent via the network input/output device to the first individual, a second non-transitory storage medium with stored data representative of a video received back from the first individual, a processor carrying out instructions to determine whether the video has associated audio representative of the string of text, a processor (same or different processor) carrying out instructions to determine whether the video has images of the first individual, and a network output over which data are sent to at least another device certifying that the picture of an individual's likeness is that of the individual.

Elements described with reference to the method may also be used in conjunction with the device.

It should be understood that the use of "and/or" is defined inclusively, such that the term "a and/or b" should be read to include the sets: "a and b," "a or b," "a," "b." Further details are set forth in the detailed description below.

BRIEF DESCRIPTION OF THE DRAWINGS

FIG. 6 shows a screenshot of a user prompt for a video upload, as used in embodiments of the disclosed technology.

DETAILED DESCRIPTION OF EMBODIMENTS OF THE DISCLOSED TECHNOLOGY

Verifying the identity of a person claiming to be represented by a picture by way of providing a string of text (randomly generated or generated by another person seeking verification of same) to be recited by the claimant. The string of text is recited in a video which is received by an intermediary server at a network node, or by a person seeking such verification. Automated processes may be utilized to compare the audio and video received to the picture and string of text sent. Further, comparisons to previously received audio, video, and strings of text, as well as same available from third parties, may be used to determine fraud attempts. Viewers of the person's profile may also vote on the authenticity of a profile, thereby raising or lowering a certification confidence level, with their votes weighted more heavily towards those who have high confidence levels.

Embodiments of the disclosed technology will become clearer in view of the following description of the figures.

Figure 1:
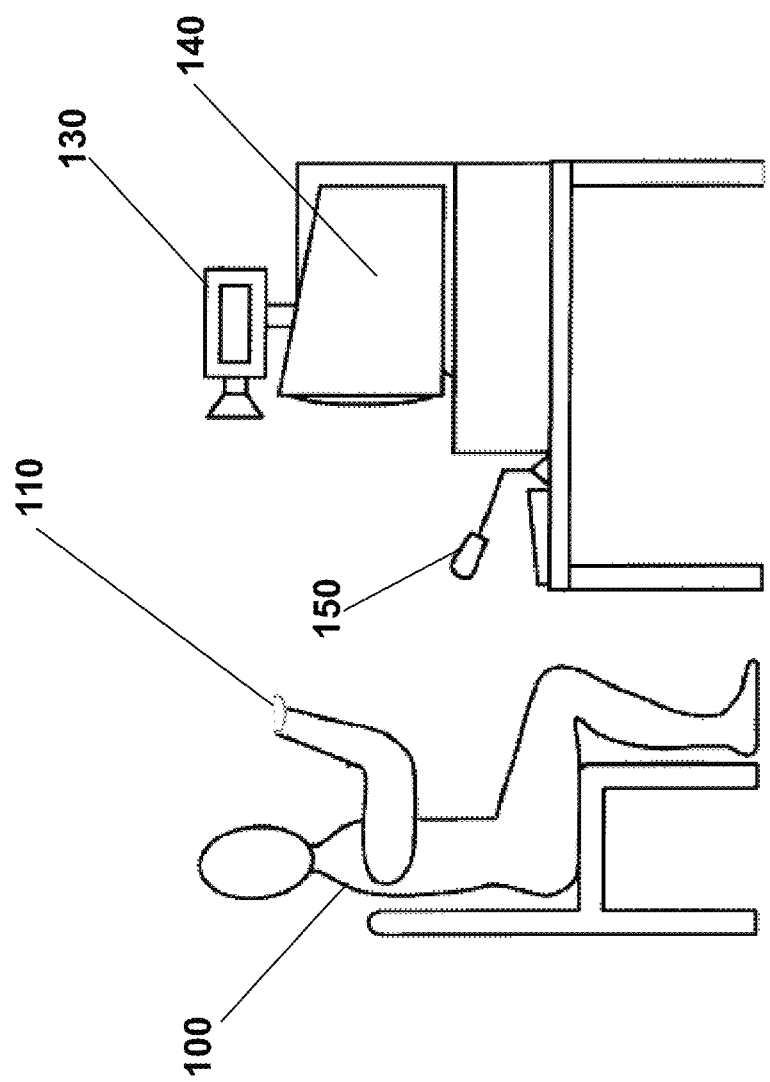
FIG. 1 shows a person and devices used in embodiments of the disclosed technology.

FIG. 1 shows a person and devices used in embodiments of the disclosed technology. Here, a person 100 sits at a computer 140 which is both the problem and the solution. A computer 140, for purposes of this disclosure, is defined as a device with a processor that carries out instructions stored on a storage medium, having a tangible output, such as a display, which can be sensed by a person, and an input device which reacts to human interaction therewith and connected to a network node whether wireless or wired. A network node is defined as a device where communicated data is received and tangibly converted to another form or re-broadcast. Here also a camera 130, defined as a video input device and microphone 150, defined as an audio input device, may be used.

Figure 2:
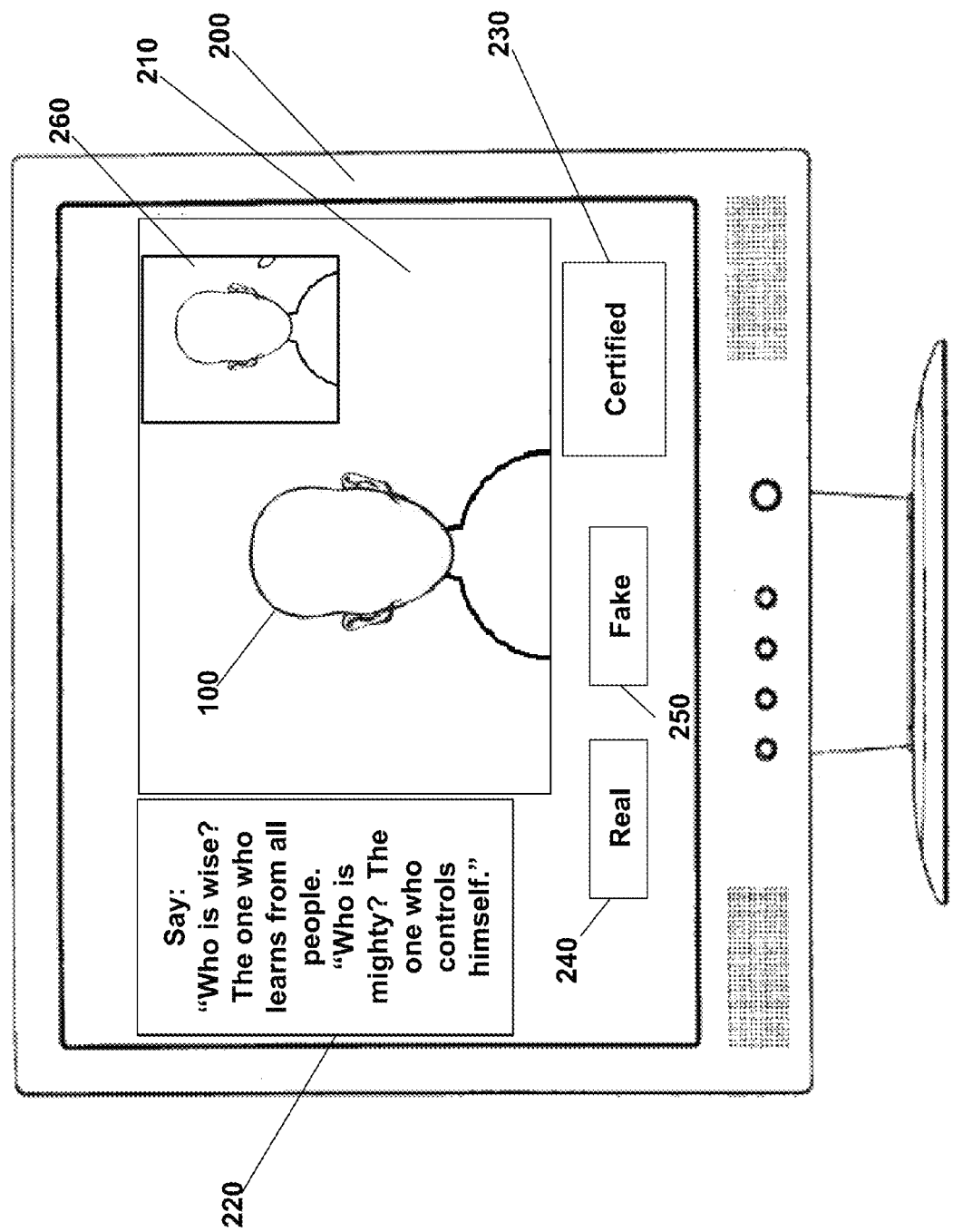
FIG. 2 shows a verification screen used by users of systems and devices of embodiments of the disclosed technology.

FIG. 2 shows a verification screen used by users of systems and devices of embodiments of the disclosed technology. A person uses a picture, such as picture 260, and associates same with the profile or user account. The terms "profile" and "user account" are used interchangeably herein and are defined as an account associated with an individual which is accessed using authentication credentials. Such credentials are, for example, a user name and password, identification number, or the like. That is, once a user is authenticated and purports to be the subject of a picture, such as picture 260, there is little chance to know if this picture is accurate. If a profile picture (picture associated with a user account) can be verified as authentic, this helps reduce fraud, because the person associated with the user account (unless hacked) is actually represented by the picture.

Referring still to FIG. 2, a video output 210 of a person 100 is shown on display 200. Here, the person is saying the phrase 220 which was chosen by, for example, a person who wishes to "date" or otherwise interact with this person in an online (defined as, "written, audio, or video communication via at least one network node from a remote location") setting. This will be described in greater detail with reference to FIG. 3. A person uses camera 130 and microphone 150 of FIG. 1, or other input devices to provide the video.

The video and audio tracks from the video are compared to the picture of the person and the phrase 220, respectively, by users or system administrators (those who operate central network nodes which provide a platform on one or more servers for multiple users to interact). Such verifiers judge if the person is real 240 or fake 250. If the person has already been deemed real, then he or she will be marked as certified in box 230. To further explain how this works, FIG. 3 delves into greater detail.

Figure 3:
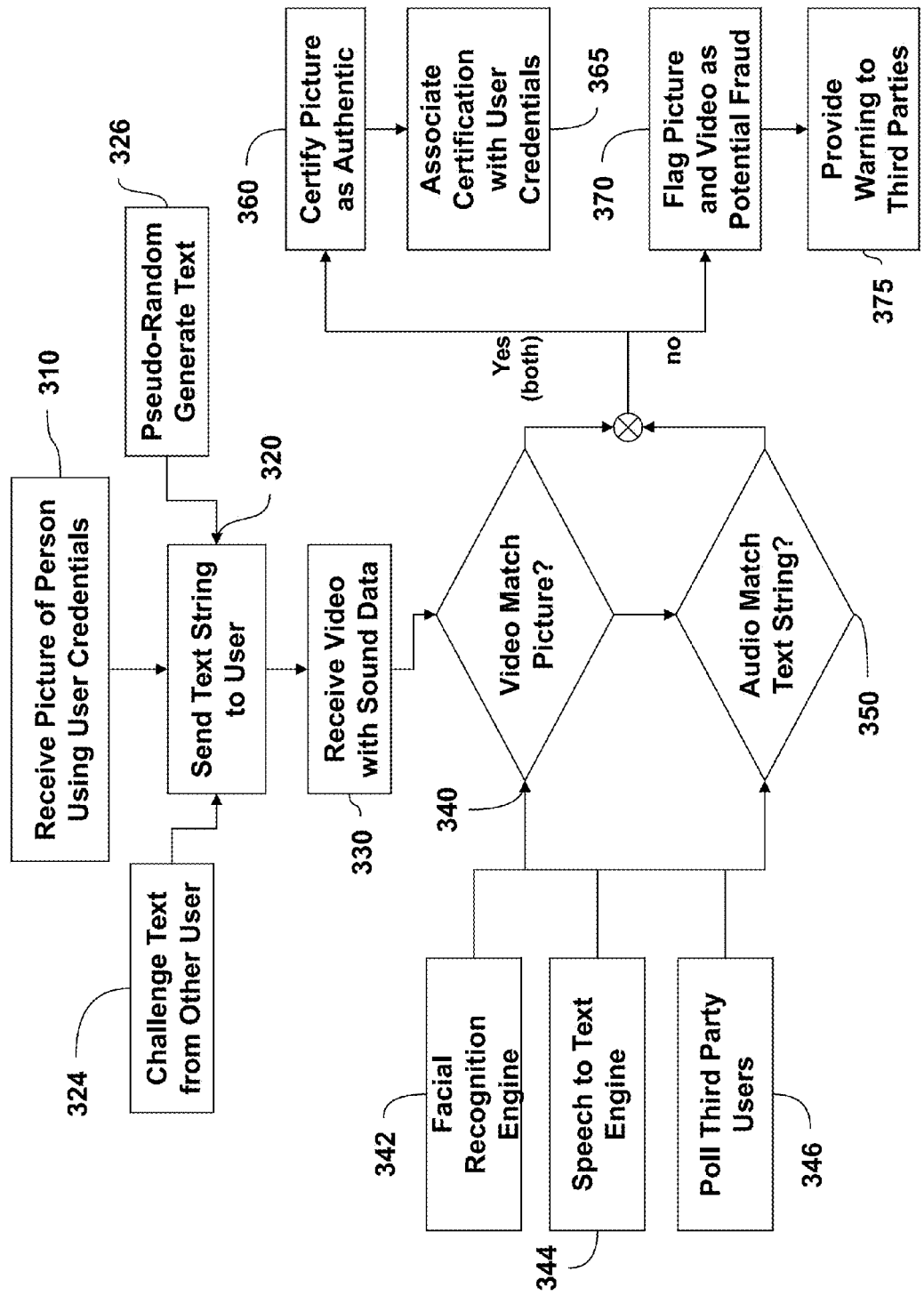
FIG. 3 is a high level flow chart of methods of carrying out embodiments of the disclosed technology.

FIG. 3 is a high level flow chart of methods of carrying out embodiments of the disclosed technology. In step 310, a picture of a person is received from a user who has been authenticated into a system recognizing or using his/her credentials. The picture or pictures may exist on a $3^{rd}$ party web site. It should be clear that while the user him- or herself is authenticated, such as by using a user name, password, and/or cellular phone verification, this is already assumed to have been accomplished in step 310, the flow chart is concerned with verification of a picture of this user. Thus, at this stage, a server has a) an authenticated user logged into the system, and b) has received a picture of the person. That is, a version of the likeness of the person in the form of an image is digitized and sent via a network to the server. The problem, however, which this disclosure shows how to solve, is verifying that this picture is, in fact, that of the credentialed/logged-in user.

In step 320, a text string is sent to the logged-in user via the network nodes, or some of the network nodes, through which the picture was received in step 310. This text string will serve as verification and can be derived in a variety of ways. It may be pseudo-randomly generated in step 326, such as by stringing together words from a dictionary list, words gleaned off the internet, or words in order of word type (such as a noun, then verb, then adjective). Sentences from various works may be taken, such as famous quotes from authors or the like. The text string may also be random characters or numbers. Or, in step 324, the text may be challenge text generated from other users. Thus, instead of "Who is wise? He who learns from all people," the challenge text might be, "I have an axe stuck in my head, and I can't get it out." Some of the words in the random sentence may be specifically chosen to easily identify based on watching the user's lips, thus preventing a fraudulent user where another user duplicates the video and overdubs another text string. For example, "I see you," would be used rather than "I saw him," because the shapes of the user's lips when reciting "I see you" are more easily identified. Additionally, some of the words in the random sentence may be specifically chosen to facilitate an automated text-to-speech process, for example, homonyms or words (or groups of words) that sound similar to other words or syllables would not be chosen. The user whose picture is being verified then enters a video chat (live or pre-recorded) session with the other person or server and sends a video, along with audio, while saying the challenge text.

The above may be illustrated with respect to FIGS. 1 and 2. In FIG. 1, the user 100 is actually recording him- or herself saying the challenge text. In FIG. 2, another user is viewing the video 210 (live or recorded) of the person 100, speaking the text 220, and making a determination as to whether the person matches the photo 260 and the text 220. As such, they send an input, which travels via a network node, to the server again, indicating real 240 or fake 250. If the person is already certified 230, when picture 260 or video 210 is shown, the certification may be shown as well. An API (application programming interface) may further be used by third party servers and others to access verified user pictures, or to display a badge signifying that this user is certified.

Referring again to FIG. 3, the steps of matching the video 340 and audio 350 are shown, as described above. Above, step 346 was described where third party users are polled. These are any users who interact with the server and may be credentialed already (either with login credentials alone or also with matching pictures). As such, a network of verified individuals verifies the new individuals, and a very trustworthy ring of people who have verified each other is built. A user, in embodiments, may choose to make his picture or verifications of others available for public viewing, or limited to $1^{st}$, $2^{nd}$, or $3^{rd}$ degree connections to other users whom they have verified or indicated knowing.

Still further, to determine if the video matches the picture, automated methods may be used, such as facial recognition. In step 342, a facial recognition engine determines if the facial elements of the person shown in the picture received in step 310 match those of the person shown in the video received in step 330. Facial recognition is known in the art. Used here, computer programs determine if there is a match between the photo and the person in the video. This can be done as a first level test before polling third party users, or having system administrators or those who work for the company operating the server providing the platform for communication between end users, verify the picture. As such, a person may be requested to submit a picture of a certain quality and be a certain size and orientation relative to the screen/camera, in the video. The position of features, such as the eyes, nose, mouth, top of head, and bottom of head may have to match by way of the facial recognition engine, and then this is passed to the human verifiers so as not to "waste their time" with obviously invalid pictures.

Likewise, a text to speech or speech to text engine 344 may be used to verify automatically that the text matches. This may be used especially for blind and hard of hearing individuals to aid them in using the system. Here, the text is verified and a test word may be used which requires a first level of verification before proceeding. For example, a person may be challenged to say "hippopotamus" which, within a tolerance threshold, is verified by a speech to text engine. This may be the only audio challenge, or the person may then be asked to say something more complex, as required by a third party user of the system or generated in steps 324 or 326, respectively.

Then, after either the one or two step (automatic and/or human) verification of either or both of the video and audio, a determination is made as to whether the picture of the person is authentic. If it is, in step 360 the picture is certified as authentic, and a certification of same is associated with the user credentials in step 365. If not, the picture and video remain unauthenticated and, further, in step 370, either or both may be flagged as potential fraud or fraudulent. As such, in step 375, a warning may be provided to third parties. Using image searching, the image found elsewhere, even on other servers and websites, may be called into question as it is being used for fraudulent, or unverifiable, purposes.

Referring to FIGS. 2 and 3 simultaneously, in step 346, where third party users decide if a person's video matches the text statement and picture, multiple parties may vote by selecting buttons 240 and 250. A percentage score of verifiability, or, alternatively, a threshold number of votes for "real," along with a percentage of total votes being same, is required in an embodiment of the disclosed technology to consider a person's picture to be verified.

Figure 4:
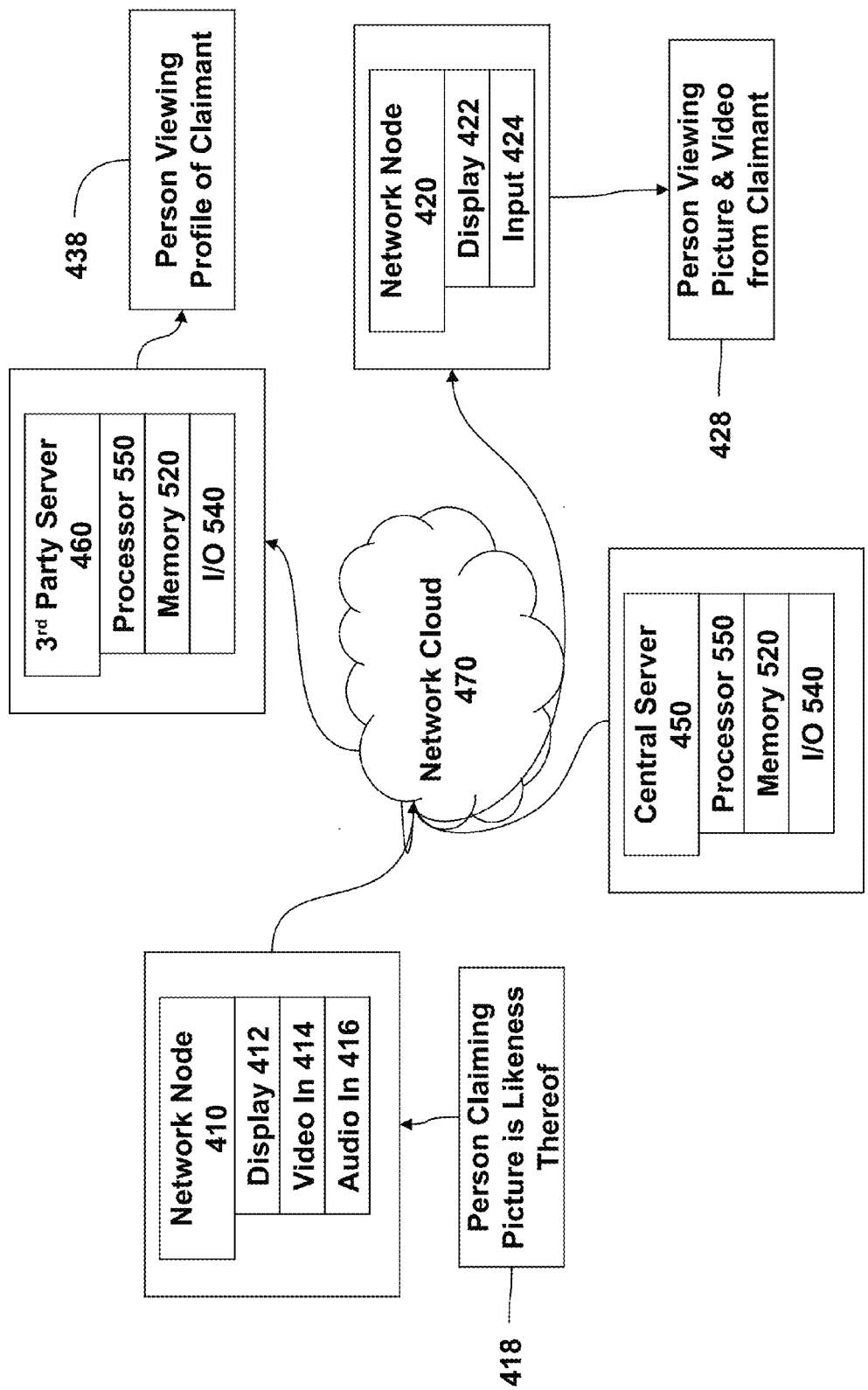
FIG. 4 shows a high-level block diagram of a system configuration that may be used to carry out aspects of the disclosed technology.

FIG. 4 shows a high-level block diagram of a system configuration that may be used to carry out aspects of the disclosed technology. Here, a person uses a computer connected via a network node 410 having a display 412, video input 414, and audio input 416. It should, of course, be understood that such a device/computer has many more components than those shown in the figures and described herein. Certain parts of the devices are highlighted for purposes of discussion. The display 412 may be a video monitor or screen, whereas the video in 414 may be a camera, and the audio in 416 may be a microphone. A person 418 using this device at this point on the network (at node 410) sends a picture of himself or herself. The person represents that this picture represents him or her. A version of the picture/likeness of the person, as claimed, is sent over a network via a plurality of network nodes, or network cloud 470, to a central server 450 with a processor 550, memory, 520, and input/output 540. This server is configured to carry out instructions sent to the processor and stored in the memory to instruct the person 418 to record a video, making a statement in the video of a string of text using the video in 414 and audio in 416. A determination is made at the central server 450 based on either input by humans on-site, pre-programmed instructions using artificial intelligence to detect if the words received through the audio in 416 match the text sent, and the person in the video matches the picture sent. Alternatively, person 428 may view the video (with its associated audio) and picture via the display 422 and network node 420 and make this determination. Person 428 is representative of many people, each of whom can make such a determination, in embodiments of the disclosed technology.

Once enough people, a known reliable person, or heuristics/artificial intelligence at the central server 450 determine that the picture of the person 418 is of a real person who resides in or accesses the network node 410, then the picture and person 418 are certified to each other. The person may be required to use the network node 410 (e.g., a certain IP address or service provider), verify using a certain phone number, or a certain login/password or other credentials. Still further, the certified status of the person behind the picture may be shared with a third party server 460. Thus, for example, a certain internet presence, such as one located at "identity-real.com," may operate or have privileges to host a website at the central server 450, while, for example, a third party server 460 may be representative of a social network such as at match.com or facebook.com. Now, when a picture is shown on the third party website, such as to a user 438, an indication that the person 418 is certified in connection with the picture sent by the person 418 is made, and a link from that picture back to the server 450 or identity-real.com (again, only by way of example) is available to check that a picture shown is actually of the person.

In embodiments of the disclosed technology, data entered (whether a video, audio, or picture) previously by users is used to determine the existence of fraud. For example, duplicate use of any of the aforementioned data in more than one profile may trigger a fraud alert. As such, a certification of a person, his/her account, or profile may then be revoked immediately or, after review by an administrator of the system (whether part of artificial intelligence, pre-programmed parameters, or a human making such a decision). Still further, when a picture is uploaded, an automatic or manual scan of third party databases, such as Internet (a collection of ip (Internet protocol) networks having nodes around the world) image search engines including, for example, images.google.com, at the time of this writing.

Further, when a text string is randomly generated or even provided by a user, such a text string may be declared invalid with a new string required, if the string has been used before or is being used too often, as it then becomes easier to forge. In some embodiments, text strings must be entirely unique from previously used such strings.

Concerning the certification of an image and person associated therewith, both audio and video matches must be above a pre-defined threshold of accuracy between the spoken word and words to be spoken, and the person's features in the video and image. For example, the audio may be stripped from the video received from a person, converted to text by way of speech to text recognition, and the text compared. If 50% of the words, or above, match, including matching the movement of the lips in the video, then this is enough to send the video to users with a minimal certification level. Likewise, with the video, an automated process of comparing edges of the face, skin color, hair color, eye color, position of cheek bones and facial hair may yield a 50% or higher correspondence between the image and video. This may then be enough to give a minimal level of certification and pass same to users. If not, the certification process stops there (or potentially marks the user as fraudulent). Once passed to users with a minimal certification, then people viewing the profile can view the video and, using "crowd-sourcing," each viewer may vote as to whether the video is authentic. The percentage certainty may then rise or fall based on votes of such human users. Their votes, however, may be unequally weighted, based on factors such as the voter having a certified image of him or herself, and the percentage ranking of that person's certification. Thus, those who post clearer video, audio, and pictures have more voting power, as they will start with a higher confidence level (percentage) and be voted higher by those viewing their profile as well.

Figure 5:
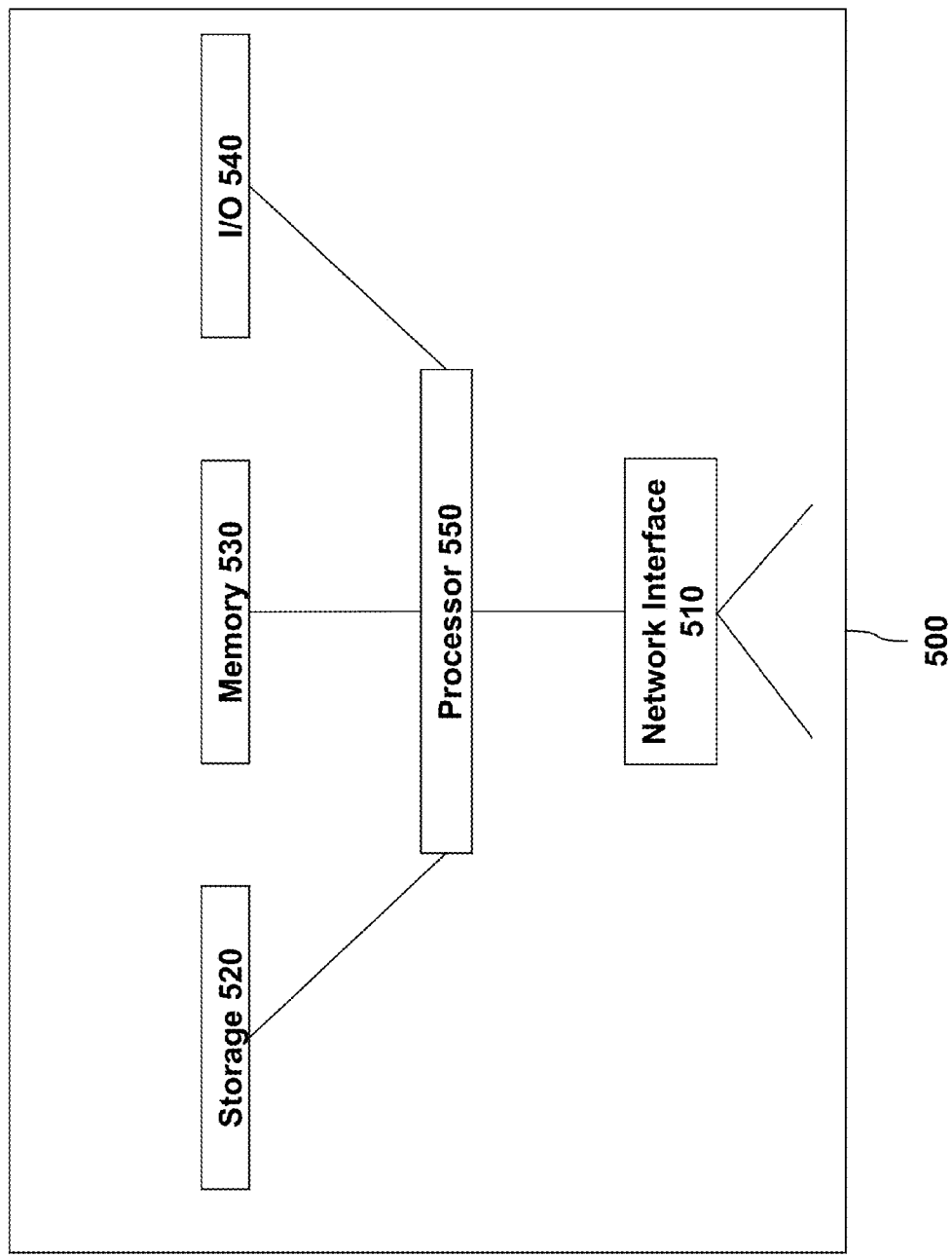
FIG. 5 shows a high-level block diagram of a device that may be used to carry out aspects of the disclosed technology.

FIG. 5 shows a high-level block diagram of a device that may be used to carry out aspects of the disclosed technology. Device 500 comprises a processor 550 that controls the overall operation of the computer by executing the device's program instructions which define such operation. The device's program instructions may be stored in a storage device 520 (e.g., magnetic disk, database) and loaded into memory 530 when execution of the console's program instructions is desired.

Thus, the device's operation will be defined by the device's program instructions stored in memory 530 and/or storage 520, and the console will be controlled by processor 550 executing the console's program instructions. A device 500 also includes one, or a plurality of, input network interfaces for communicating with other devices via a network (e.g., radio signaling). The device 500 further includes an electrical input interface for receiving power and data from a battery or other power source.

A device 500 also includes one or more output network interfaces 510 for communicating with other devices. Device 500 also includes input/output 540 representing devices which allow for user interaction with a computer (e.g., display, keyboard, mouse, speakers, buttons, etc.). One skilled in the art will recognize that an implementation of an actual device will contain other components as well, and that FIG. 5 is a high level representation of some of the components of such a device for illustrative purposes. It should also be understood by one skilled in the art that the methods and devices depicted in FIGS. 1 through 4 may be implemented on a device such as is shown in FIG. 5.

FIG. 6 shows a screenshot of a user prompt for a video upload, as used in embodiments of the disclosed technology.

A unique sentence is shown to be read, along with an upload button and the ability to specify the user's account on various third-party server as well as the user's email address, phone number or phone numbers.

Figure 7:
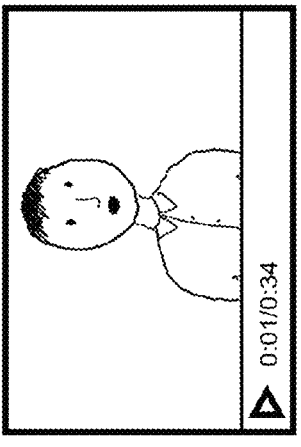
FIG. 7 shows a screenshot of an interface used to verify the identity of another user.

FIG. 7 shows a screenshot of an interface used to verify the identity of another user. Here, a video is shown of a person reading the sentence listed, in this case, "The brown puppy leap over the blue wooden fence." The voter may then select whether or not the person in the video correctly read the sentence, and the person can be verified based on their linked third-party servers (websites) where they claim a profile. Here, "Lisa." is logged in and watching "Dave's" video to verify that he says the correct random sentence. At the bottom of the page, Lisa can check to see if the profile Dave gave her is really his. In this case, Dave told Lisa that his Facebook userid is "dave", so she has entered that to confirm that this is the right person and not an impersonator.

Figure 8:
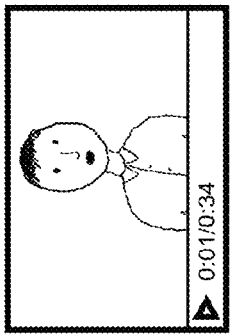
FIG. 8 shows a screenshot of a user profile displayed to others with the results of automated verification.

FIG. 8 shows a screenshot of a user profile displayed to others. Here, "Lisa" is checking to see if "Dave" is the person he says he is. The audio verification shows how well the speech-to-text matched the random sentence. The photo verification shows the results of the facial recognition. The photos can either be 1) uploaded by Lisa, 2) uploaded by Dave, or 3) at the instructions of Dave via his network node, selected for download from a social network (3$^{rd}$ party platform or server) when Dave inputs the name of the social network and his user ID (identification), another unique identifier, or authentication credentials on that social network. In addition to third-party websites, Lisa can also verify that a phone number belongs to Dave, and not an impersonator.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the disclosed technology.

We claim:

1. A method of confirming the identity of a person in a picture, comprising the steps of:
   receiving at least one picture comprising a version of an individual's likeness via a first network node associated with a first individual;
   providing a string of text to said first individual via said first network node;
   receiving data representative of a video from said first individual, said video comprising associated audio;
   determining, by way of a processor carrying out instructions, whether said associated audio includes a version of said string of text;
   determining, by way of a processor carrying out instructions, whether said video comprises images of said first individual;
   providing, via at least a second network node, a certification to at least a second individual that said picture comprising a version of an individual's likeness is that of said first individual.

2. The method of claim 1, wherein said determining that said audio includes a version of said string of text is carried out by way of votes by viewers of a profile associated with said first individual.

3. The method of claim 2, wherein said determining further includes:
   converting said associated audio to text, using an automated process;
   identifying a level of match of said converted text to said string of text provided to said first user; and
   only if said level of match is above a pre-defined threshold level, presenting said video to said viewers for receiving said votes.

4. The method of claim 2, wherein said determining further includes:
   using face recognition on said video to obtain a face recognition output;
   identifying a level of match of said face recognition output to said received picture; and
   only if said level of match is above a pre-defined threshold, presenting said video to said viewers for receiving said votes.

5. The method of claim 2, wherein said certification is made when a match of both audio and video is above a pre-defined threshold and a percentage certainty is provided with the certification.

6. The method of claim 5, wherein said percentage certainty is raised based on a number of said votes by said viewers.

7. The method of claim 6, wherein a vote of one of said viewers is more heavily weighted when said one of said viewers has a certified image associated with him/her.

8. The method of claim 7, wherein the higher a percentage certainty of said certified image is associated with said one of said viewers, the higher a weighting given to a vote for said first individual.

9. The method of claim 1, wherein said first individual has user authentication credentials, the method further comprising requiring to send said user authentication credentials before communicating as a certified individual associated with said certification of said picture.

10. The method of claim 1, further comprising receiving said string of text from said second individual viewing a profile associated with said first individual and expressing a desire to verify said picture comprising a version of an individual's likeness.

11. The method of claim 10, further comprising:
   storing said string of text in a non-transitory computer-readable storage medium; and
   in a second distinct time, when the method of claim 1 is carried out, selecting a second said string of text by a person viewing a picture of a second said first individual,
   wherein said string of text is accepted only if said second string of text is unique compared to said string of text stored in said non-transitory computer readable storage medium.

12. The method of claim 1, further comprising providing a hyperlinked badge for use in connection with a said certified picture, said hyperlink linking to a server operated by an entity carrying out said method of claim 1 and providing a verification that said picture is certified.

13. The method of claim 1, wherein said string of text is randomly generated from a stored database of words.

14. The method of claim 13, further comprising comparing said randomly generated string of text to previously generated random strings of text, and generating and sending a new string of text to said first individual when the first randomly generated string of text was found to lack uniqueness.

15. The method of claim 13, further comprising comparing said video to previous videos in said database to determine attempted fraudulent verification by said individual.

16. The method of claim 13, further comprising comparing said picture of an individual's likeness to a database of images available from a third party internet server to detect fraud.

17. A device with a processor configured to carry out instructions, comprising:
- a network input/output device receiving data representative of a picture of an individual's likeness via a first network node associated with a first individual;
- a first non-transitory storage medium with a stored string of text to be sent via said network input/output device to said first individual;
- a second non-transitory storage medium with stored data representative of a video received back from said first individual, said video having associated audio;
- a processor carrying out instructions to determine whether said associated audio includes a version of said string of text;
- a processor carrying out instructions to determine whether said video comprises images of said first individual;
- a network output over which data is sent to at least another device certifying that said picture of an individual's likeness is that of said individual.

18. The device of claim 17, wherein said string of text is randomly generated from a stored database of words.

19. The device of claim 18, wherein said processor carries out instructions to compare said randomly generated string of text to previously generated random strings of text, and to generate and send a new string of text to said first individual when the first randomly generated string of text was found to lack uniqueness.

20. The device of claim 19, wherein said processor carries out instructions to compare said video to previous videos in said database to determine attempted fraudulent verification by said individual.

\* \* \* \* \*